(12) United States Patent
Kim

(10) Patent No.: US 10,733,694 B2
(45) Date of Patent: Aug. 4, 2020

(54) SEMICONDUCTOR DEVICE FOR PROCESSING IMAGE DATA IN LAYERS FOR DISPLAY BY A DISPLAY DEVICE

(71) Applicant: Kyoung-Man Kim, Suwon-si (KR)

(72) Inventor: Kyoung-Man Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 485 days.

(21) Appl. No.: 14/744,068

(22) Filed: Jun. 19, 2015

(65) Prior Publication Data

US 2016/0063668 A1 Mar. 3, 2016

(30) Foreign Application Priority Data

Sep. 1, 2014 (KR) .......................... 10-2014-0115481

(51) Int. Cl.
*G06T 1/60* (2006.01)
*G09G 5/393* (2006.01)

(52) U.S. Cl.
CPC ............... *G06T 1/60* (2013.01); *G09G 5/393* (2013.01); *G09G 2320/103* (2013.01); *G09G 2330/021* (2013.01); *G09G 2360/122* (2013.01); *G09G 2370/10* (2013.01)

(58) Field of Classification Search
None
See application file for complete search history.

(56) References Cited

U.S. PATENT DOCUMENTS

| 8,045,828 | B2 | 10/2011 | Goto et al. |
| 8,451,280 | B2 | 5/2013 | Ishioka |
| 9,373,308 | B2 | 6/2016 | Ohba et al. |
| 2004/0174385 | A1 | 9/2004 | Ikeda et al. |
| 2009/0115798 | A1* | 5/2009 | Shimada ............ H04N 5/44504 345/621 |
| 2010/0134477 | A1* | 6/2010 | Kim ..................... G09G 3/3406 345/214 |
| 2011/0037773 | A1 | 2/2011 | Ishioka |
| 2011/0221780 | A1* | 9/2011 | Inada ....................... G09G 5/36 345/660 |
| 2011/0280307 | A1* | 11/2011 | MacInnis ................. G06T 9/00 375/240.15 |
| 2012/0218277 | A1* | 8/2012 | Matilla ................... G09G 5/363 345/520 |
| 2013/0002596 | A1 | 1/2013 | Ke et al. |
| 2014/0098438 | A1 | 4/2014 | Poudyal |

(Continued)

FOREIGN PATENT DOCUMENTS

| CN | 103988164 A | 4/2011 |
| CN | 102016974 A | 8/2014 |

(Continued)

*Primary Examiner* — Hilina K Demeter
(74) *Attorney, Agent, or Firm* — Volentine, Whitt & Francos, PLLC

(57) ABSTRACT

A semiconductor device includes; a first memory that stores first and second layer image data portions used to generate first and second frame images on a display device, a second memory that stores a change map, a display controller that generates positional information associated with an image data portion in response to the change map, and an interface that receives image data and positional information and generates a command for updating the image data.

20 Claims, 16 Drawing Sheets

(56) References Cited

U.S. PATENT DOCUMENTS

2014/0340421 A1* 11/2014 Otero ............... G06T 11/20
                                                 345/619
2014/0354664 A1* 12/2014 Brown .............. G09G 5/363
                                                 345/545
2015/0123993 A1*  5/2015 Ohba ............... G09G 5/00
                                                 345/629

FOREIGN PATENT DOCUMENTS

| JP | 11-212690    | 6/1999  |
|----|--------------|---------|
| JP | 2007-010970  | 1/2007  |
| JP | 4469788      | 6/2007  |
| JP | 2007-248635  | 9/2007  |
| JP | 2010-181573  | 6/2010  |
| JP | 2010-243613  | 10/2010 |
| JP | 2011-232467  | 11/2011 |
| JP | 2013-228851  | 11/2013 |

* cited by examiner

FIG. 7

| UE | | F(n+1) | | | |
|---|---|---|---|---|---|
| 0 | 0 | X | 0 | 0 | ⎫ L1 |
| 0 | 0 | X | 0 | 0 | |
| 0 | 0 | X | 0 | 0 | ⎫ |
| 0 | 0 | 0 | 0 | 0 | |
| 0 | 0 | 0 | 0 | 0 | ⎬ L2 |
| 0 | 0 | 0 | X | X | |
| 0 | 0 | 0 | 0 | 0 | ⎭ L3 |

1001

1100

1200

SEMICONDUCTOR DEVICE FOR PROCESSING IMAGE DATA IN LAYERS FOR DISPLAY BY A DISPLAY DEVICE

CROSS-REFERENCE TO RELATED APPLICATION

This application claims priority under 35 U.S.C. 119 from Korean Patent Application No. 10-2014-0115481 filed on Sep. 1, 2014, the subject matter of which is hereby incorporated by reference.

BACKGROUND

With enhancement in the performance of many contemporary electronic devices, the resolution of a display panel mounted on the electronic apparatus has also improved. However, power consumption by the driving systems associated with these high-resolution display panels has significantly increased.

SUMMARY

The inventive concept has been made in an effort to provide a semiconductor device having reduced operating power consumption.

According to an embodiment of the inventive concept, there is provided a semiconductor device comprising: a first memory storing a first layer image data for outputting a first frame image and second layer image data; a display controller generating configured to generate positional information regarding a first unit element by using a change map including information on the first unit element that satisfies a predetermined condition among a plurality of unit elements for outputting the first frame image, reading data regarding the first unit element among the first layer image data based on the positional information, and reading data regarding the first unit element among the second layer image data; and an interface receiving configured to receive the generated positional information and the read data regarding the first unit element to generate a command for updating the first unit element among the plurality of unit elements for outputting the first frame image.

According to another embodiment of the inventive concept, there is provided a semiconductor device comprising: a first memory storing configured to store first layer image data for outputting partial regions of first and second frame images and second layer image data for outputting another partial regions of the first and second frame images; a comparison unit comparing configured to compare first layer image data for outputting a partial region of the first frame image and first layer image data for outputting a partial region of the second frame image and comparing compare second layer image data for outputting another partial region of the first frame image and second layer image data for outputting another partial region of the second frame image to generate a change map including information on a first unit element required to be changed among a plurality of unit elements for outputting the second frame image; and a display controller reading data regarding the first unit element among the first layer image data for outputting the second frame image and reading data regarding the first unit element among the second layer image data for outputting the second frame image, by using the change map.

According to another embodiment of the inventive concept, there is provided a semiconductor device comprising: a frame buffer buffering configured to buffer image data to be output to an display panel; a frame buffer updater receiving, when an image output to the display panel is changed from a first frame image to a second frame image, image data regarding a unit element required to be changed among a plurality of unit elements for outputting the second frame image and updating update the image data stored in the frame buffer, which corresponds to the received image data; and a driver outputting configured to output an image signal based on the image data stored in the frame buffer.

The technical objects of the inventive concept are not limited to the aforementioned technical objects, and other technical objects, which are not mentioned above, will be apparent to those skilled in the art from the following description.

BRIEF DESCRIPTION OF THE DRAWINGS

The above and other features and advantages of the inventive concept will become more apparent by describing in detail embodiments thereof with reference to the attached drawings in which:

FIGS. 6, 7 and 8 are conceptual diagrams further describing operation of the semiconductor device according to the embodiment of the inventive concept;

DETAILED DESCRIPTION

Figure 1:
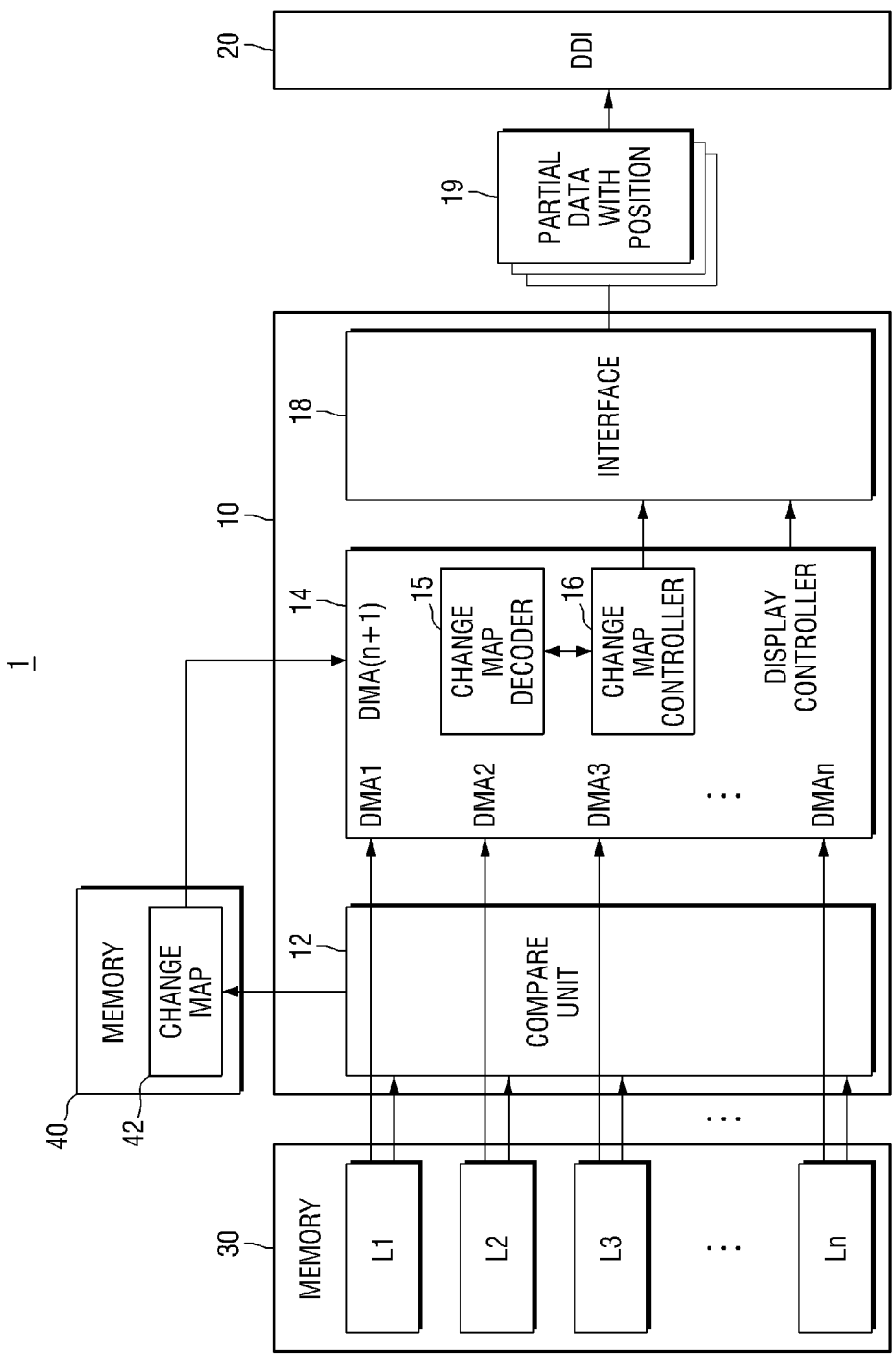
FIG. 1 is a block diagram of a semiconductor device according to an embodiment of the inventive concept.

Advantages and features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 2:
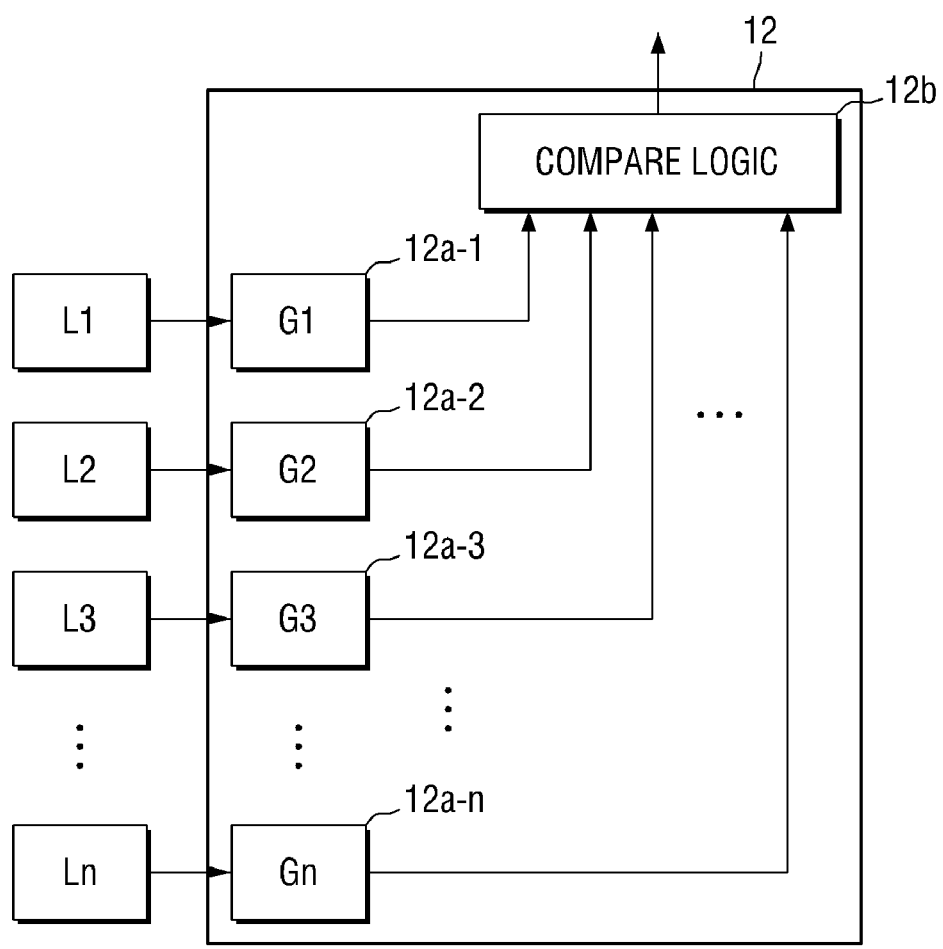
FIG. 2 is a block diagram illustrating a configuration of a comparison unit of FIG. 1.
Figure 3:
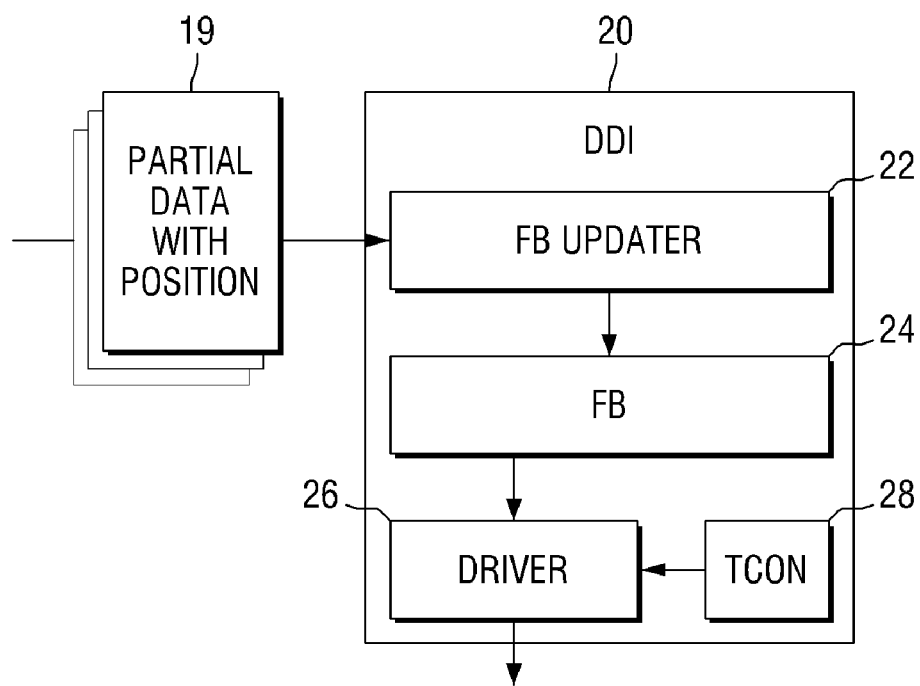
FIG. 3 is a block diagram illustrating a configuration of a display driving integrated circuit (DDI) of FIG. 1.

Hereinafter, a semiconductor device according to an embodiment of the inventive concept will be described with reference to FIGS. 1, 2 and 3. FIG. 1 is a block diagram illustrating a semiconductor device 1, FIG. 2 is a block diagram further illustrating in one example the compare unit 12 of FIG. 1, and FIG. 3 is a block diagram further illustrating in one example the display driving integrated circuit (DDI) of FIG. 1.

Referring to FIG. 1, the semiconductor device 1 includes an application processor (AP) 10, the display drive integrated circuit (DDI) 20, a first memory 30, and a second memory 40.

Layer image data (including respective "portions" L1 to Ln) is stored in the first memory 30. Here, the first memory 30 may be implemented using a volatile memory device, such as a dynamic random access memory (DRAM), and/or a non-volatile memory device, such as a NAND flash, a NOR flash, a magnetic random access memory (MRAM), a phase-change random access memory (PRAM), a resistive random access memory (RRAM), etc. Alternately or additionally, the first memory 30 may be implemented using a hard disk drive, a magnetic memory device, or similar device.

The image data is provided to a display device (e.g., a display panel, not shown in FIG. 1) according to layer image data portions (e.g., L1 to Ln) stored in the first memory 30. In certain embodiments of the inventive concept, the image data (collectively, the first image data portions L1 to Ln) may constitute one or more frames of display data, where each respective layer image data portion may constitute a respective frame, or a portion of a frame. That is, with reference to the size, resolution and geometry of a given display panel, one frame may be displayed in response to one or more layer image data portion (L1 to Ln).

For example, assuming that the first, second and third layer image data portions (L1, L2 and L3) are sequentially provided to generate a first frame image and a second frame image using the display panel. Here, the first layer image data portion L1 may correspond to one or more upper region(s) of the first and second frame images, the second layer image data portion L2 may correspond to one or more central region(s) of the first and second frame images, and the third layer image data L3 may correspond to one or more lower region(s) of the first and second frame images.

The plurality of layer image data portions L1 to Ln may be generated using an external image data generation unit (not shown), and then stored in the first memory 30. For example, the first layer image data portion L1 may be generated using a first application, the second layer image data portion L2 may be generated using a second application, and the third layer image data portion L3 may be generated using a third application, and so on.

The AP 10 receives the layer image data portions L1 to Ln from the first memory 30, processes the received layer image data portions, and then provides the processing result to the DDI 20. In the illustrated example of FIG. 1, the AP 10 includes a compare unit 12, a display controller 14, and an interface 18.

Here, the term "unit" is used to described software and/or hardware component(s) such as a floating-point gate array (FPGA) and/or an application specific integrated circuit (ASIC) performing predetermined functions. Alternately or additionally, a unit may be implemented, wholly or in part, using data stored in an addressable storage medium. Therefore, a given unit may be configured from one or more of a variety of components, such as object oriented software components, class components, task components, processes, functions, attributes, procedures, subroutines, segments of a program code, drivers, firmware, a microcode, a circuit, data, a database, data structures, tables, arrays, and variables. The various functions provided by a units or its constituent components may be collected into a smaller number of components and/or units, or separated into additional components and/or units.

Thus, the AP 10 shown in FIG. 1 and including the compare unit 12, display controller 14, and interface 18 may be variously implemented in a number of different component configurations. For example, one or more of the illustrated components may be provided external to the AP 10.

However configured, the compare unit 12 receives the layer image data portions L1 to Ln stored in the first memory 30, and compares the received layer image data portions in order to generate a change map 42, where the compare unit 12 may store the generated change map 42 in the second memory 40.

Referring now to FIGS. 1 and 2, the illustrated example of the compare unit 12 includes generation units 12a-1 to 12a-n and compare logic 12b. Each of the generation units 12a-1 to 12a-n may be used to receive one of the layer image data portions L1 to Ln and generate corresponding cyclic redundancy check (CRC) data. That is, a first generation unit 12a-1 may generate first CRC data for the first layer image data L1 and provide the first CRC data to the compare logic 12b, a second generation unit 12a-2 may generate second CRC data for the second layer image data L2 and provide the second CRC data to the compare logic 12b, and so on.

The compare logic 12b upon receiving CRC data from each of the generation units 12a-1 to 12a-n may process the respective CRC data in order to generate the change map 42. For example, the compare logic 12b may receive the first CRC data from the first generation unit 12a-1 and perform a CRC operation of the first CRC data to generate a first portion of the change map 42 associated with the first layer image data L1, and so on.

In FIG. 1 the compare unit 12 is configured to generate the change map 42 and store it in the second memory 40. However, different approaches to the generation and storing of a change map may be taken. For example, the change map 42 stored in the second memory 40 may be generated using such external components as (e.g.,) a graphic processing unit (GPU) or a central processing unit (CPU).

The second memory 40 that receives the change map 42 from the compare unit 12 and stores it using a volatile memory device such as a DRAM, and/or a non-volatile memory device such as a static random access memory (SRAM), NAND flash, NOR flash, MRAM, PRAM, RRAM, or the like, and/or a hard disk drive, magnetic memory device, or the like.

In the illustrated example of FIG. 1, the first memory 30 and second memory 40 are shown as being separately implemented for ease of description. However, the inventive concept is not limited to only this illustrated configuration, and the first memory 30 and second memory 40 may be commonly provided using the same hardware and/or software components. Thus, the first memory 30 and second memory 40 may include different or the same types of memory.

Under certain conditions, the display controller 14 may be used to generate and provide "positional information" associated with one or more of the layer image data portions L1 to Ln and in relation to the change map 42. Such positional information may subsequently be provided with each respective, associated layer image data portion(s) L1 to Ln. The specific conditions upon which this generation and provision of positional information with a layer image data portion are made will vary by design. However, in one example, it is assumed that one or more layer image data portions corresponding to visually changing portions of the displayed image will be supplemented with positional information. This example will be described in some additional detail hereafter. Such layer image data portions may be understood as being "designated" for supplementation by associated positional information and will hereafter, regardless of defining condition(s), will be referred to as "designated layer image data portion(s)".

Referring still to FIG. 1, the display controller 14 comprises a change map decoder 15 and a change map controller 16. Here, the change map decoder 15 receives the change map 42 and decodes it. The change map controller 16 may then be used to generate positional information for designated layer image data portion(s), and provide the generated positional information to the interface 18.

The change map decoder 15 and change map controller 16 are shown as being separately provided in FIG. 1 but the inventive concept is not limited thereto.

In relation to the embodiment illustrated in FIG. 1, when 'n' layer image data portions L1 to Ln are stored in the first memory 30, the display controller 14 will include 'n+1' direct memory access (DMA) ports (e.g., DMA1 to DMA (n+1)). In other words, the number of the DMA ports available at the display controller 14 may be at least one larger than the number of layer image data portions L1 to Ln provided by the first memory 30. Here, a first DMA port (DMA1) through an n-th DMA port (DMAn) may respectively be used to receive first through n-th layer image data portions L1 to Ln. Additionally, an (n+1)-th DMA port may be used to communicate the change map 42 to the second memory 40.

The interface 18 receives designated layer image data portion(s) together with associated positional information from the change map controller 16. The display controller 14 may then be used to generate one or more commands necessary to update the received designated layer image data portion(s) (hereafter, referred to as "partial image data"), and the interface 18 may be used to provide the partial image data 19 to the DDI 20 together with the generated commands.

In certain embodiments of the inventive concept, the interface 18 may include a HS/Link but the scope of the inventive concept is not limited thereto.

Referring to FIGS. 1 and 3, the DDI 20 may in one example comprise a frame buffer updater 22, a frame buffer (FB) 24, a driver 26, and a timing controller 28.

The frame buffer 24 may be used to buffer the received partial image data. Thus, the frame buffer 24 may include a storage device for storing the partial image data. The frame buffer 24 may be implemented using (e.g.,) a memory device, such as a SRAM, DRAM, MRAM, RRAM, PRAM, and the like.

The frame buffer updater 22 may be used to update only the partial image data 19 received from the AP 10 from among the totality of image data stored in the frame buffer 24.

The driver 26 may be used to receive image data from the frame buffer 24, generate an image signal in response to the received image data, and thereafter, provide the generated image signal to the display panel. Here, the image data provided from the frame buffer 24 will be digital data, where the image signal output provided by the driver 26 will be an analog signal. Thus, in certain embodiments of the inventive concept, the driver 26 may include a gate driver and/or a source driver, where the gate driver sequentially provides a gate driving signal to the display panel via gate line(s) under the control of the timing controller 28 and the source driver provides the image signal to the display panel via source line(s) under the control of the timing controller 28.

The display panel will include a number of pixels. Gate lines and source lines will be disposed on the display panel in a crossing arrangement to form a matrix having cross points defined the location of the respective pixels. In some embodiments of the inventive concept, each pixel will include a plurality of colored dots (e.g., read, green and blue or RGB).

As noted above, the timing controller 28 controls the source driver and gate driver. The timing controller 28 may receive a plurality of control signals and data signals from an external circuits. The timing controller may generate a gate control signal and a source control signal in response to received control signals and data signals, and output the gate control signal to the gate driver and the source control signal to the source driver.

Figure 4:
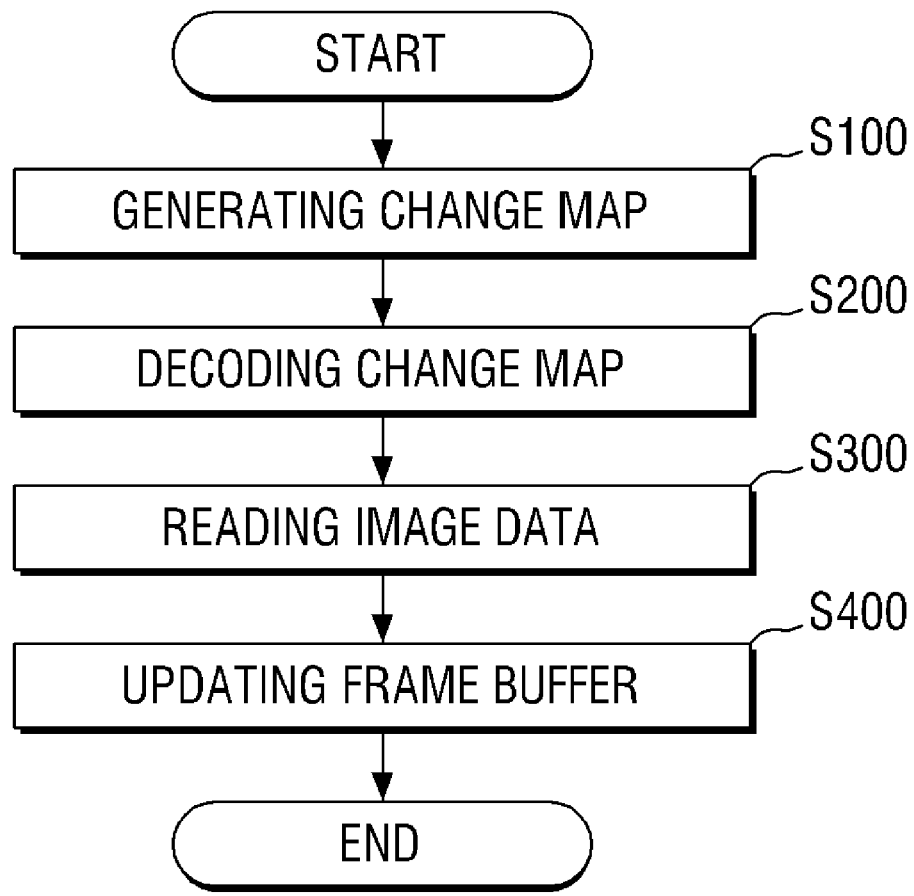
FIGS. 4 and 5 are flowcharts for describing an operation of a semiconductor device according to an embodiment of the inventive concept.
Figure 5:
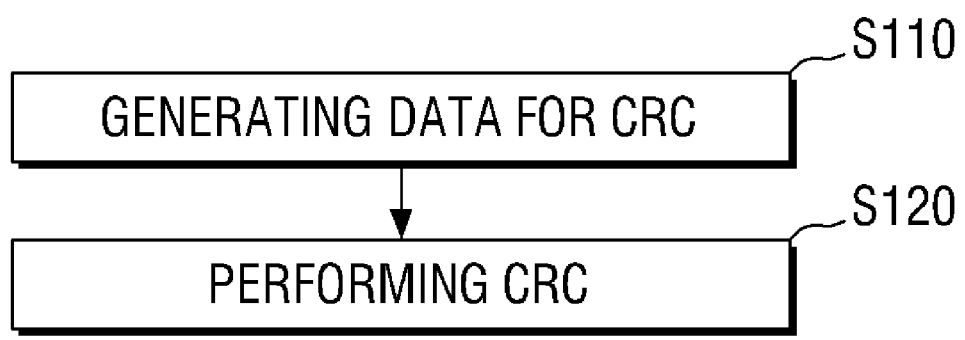
Figure 8:
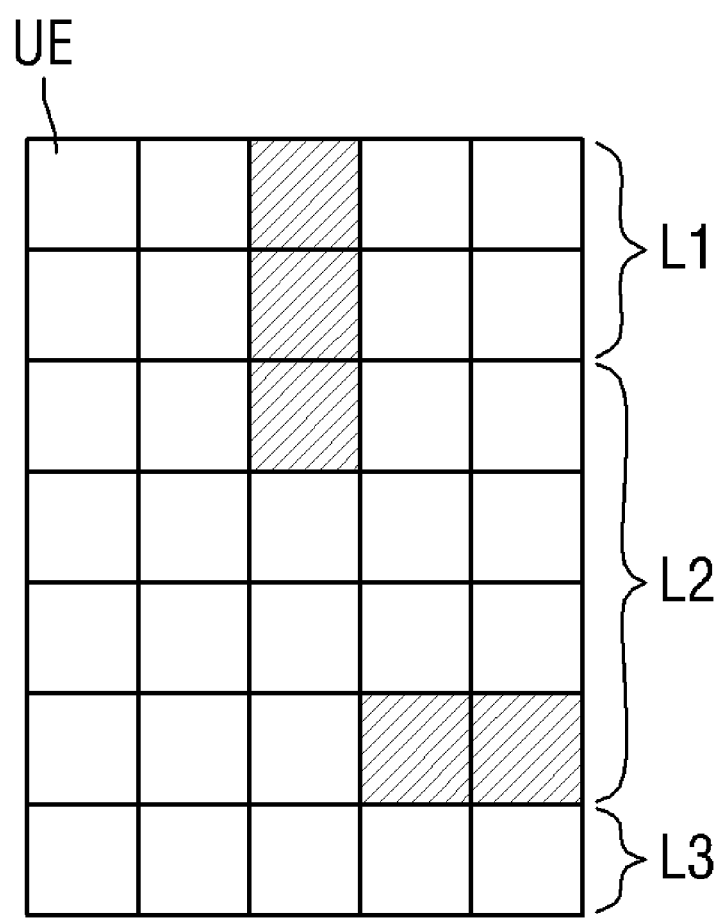

An exemplary operation of a semiconductor device according to certain embodiments of the inventive concept will now be described with reference to FIGS. 4, 5, 6, 7 and 8. Here, FIGS. 4 and 5 are flowcharts variously summarizing operation of the semiconductor device, and FIGS. 6, 7 and 8 are conceptual diagrams further describing operation of the semiconductor device.

Figure 6:
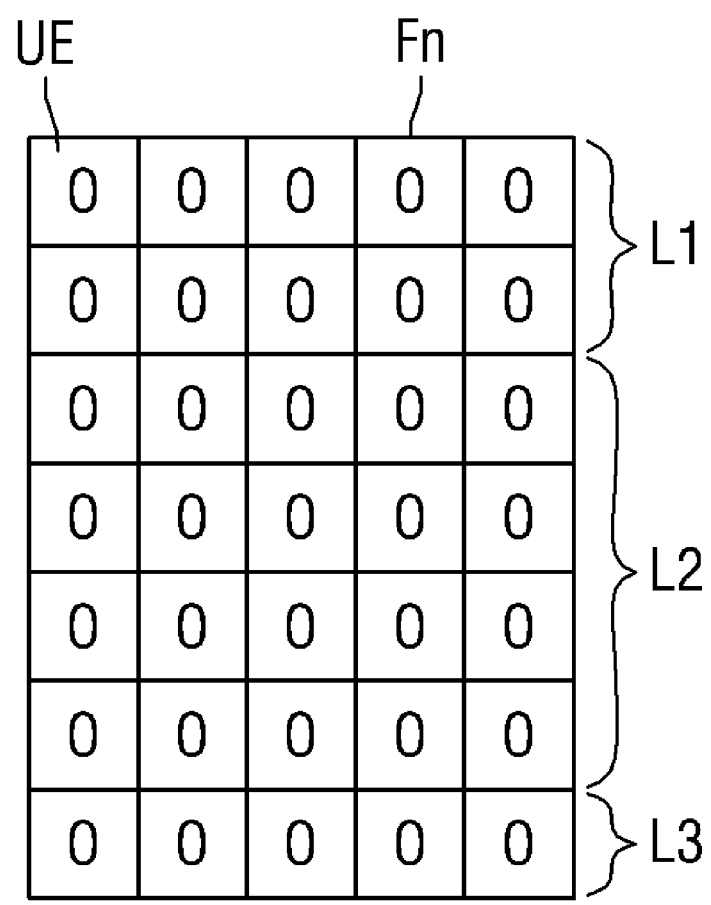

As illustrated in FIG. 6, it is assumed that an n-th frame image (Fn) is provided to the display panel using the first, second and third layer image data portions L1 to L3 as an example. That is, when the n-th frame image Fn is output to the display panel, the first layer image data portion L1 corresponds to the two most upper columns of the n-th frame image Fn, the second layer image data portion L2 corresponds to the four next-most upper columns of the n-th frame image Fn, and the third layer image data portion L3 corresponds to a last column of the n-th frame image Fn.

Each of the first, second and third layer image data portions includes a plurality of unit elements (UEs). In the certain embodiments of the inventive concept, each unit element (UE) is a corresponding tile, but the scope of the inventive concept is not limited thereto. Thus, as illustrated in FIG. 6, the first layer image data portion L1 is divided into 10 UEs, the second layer image data portion L2 is divided into 20 UEs, and the third layer image data portion L3 is divided into 5 UEs.

Figure 7:
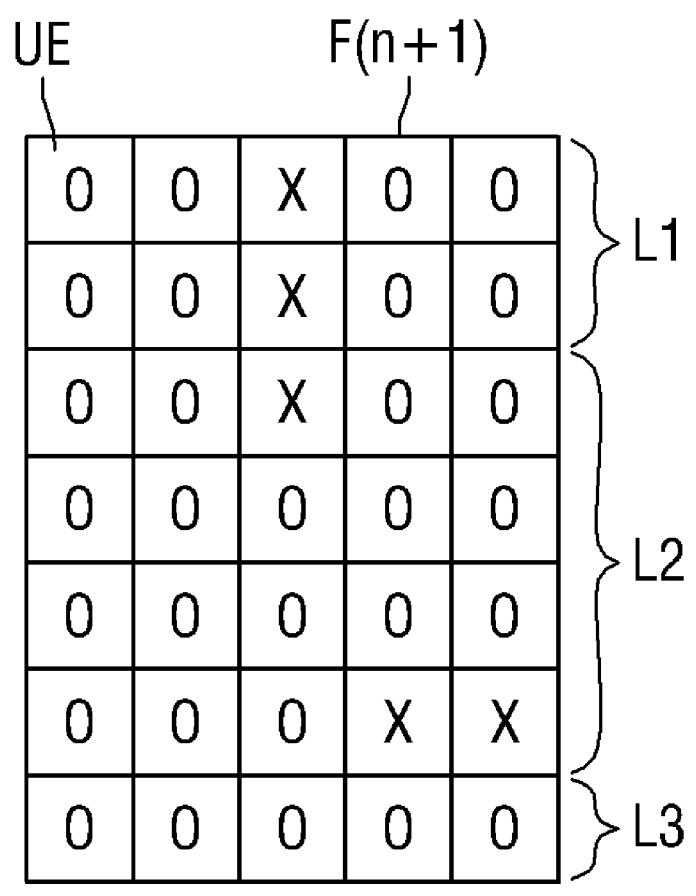

With these assumptions and further assuming that the n-th frame image (Fn) of FIG. 6 has already been displayed on the display panel, the process of outputting an (n+1)-th frame image (F(n+1)), as illustrated in FIG. 7, to the display panel will now be described.

Referring now to FIG. 4 in the context of the foregoing operational assumptions, the change map is generated (S100). More particularly, with reference to FIG. 5, CRC data is generated for each of the unit elements included in the first, second and third layer image data portions L1 to L3 (S110). See, the foregoing description provided with reference to FIG. 2. Then, a CRC operation is performed with respect to the generated CRC data (S120). For example, the compare logic 12b of the compare unit 12 shown in FIG. 2 may receive the CRC data and using an appropriate CRC operation designate certain unit elements within each layer image data portion that satisfy one or more condition(s), thereby designating certain layer image data portion(s) and/or selected unit elements of the designated layer image data portion(s).

Comparing the conceptual illustrations of FIGS. 6 and 7, for example, when the n-th frame image of FIG. 6 is changed to the (n+1)-th frame image of FIG. 7, two (2) unit elements of the first layer image data portion L1, three (3) unit elements of the second layer image data portion L2, and zero (0) unit elements of the third layer image data portion L3 are identified and selected by the compare logic 12b as meeting certain defined condition(s).

Consistent with the selection of the foregoing unit elements that satisfy the defined condition(s) from among the first, second and third layer image data portions L1 to L3, the compare logic 12b may be used to generate a change map, like the one illustrated in FIG. 8 and store the generated change map in the second storage unit 40.

Thus, the conceptual diagram shown in FIG. 8 illustrates the image data to be output to the display panel when the n-th frame image illustrated in FIG. 6 changes to the (n+1)-th frame image illustrated in FIG. 7, where designated unit elements requiring change are indicated by shaded areas.

Returning to FIG. 4, the change map is decoded (S200). That is, the change map decoder 15 of FIG. 1 may be used to receive the change map 42 from the second memory 40 via the (n+1)-th DMA port and decode the received the change map 42.

Subsequently, the change map controller 16 may receive a decoding result for the change map 42 from the change map decoder 15 and in the case of the image data output to the display panel, when the n-th frame image illustrated in FIG. 6 is changed to the (n+1)-th frame image illustrated in FIG. 7, the change map controller 16 will generate positional information associated with the designated unit elements in the first and third layer image data portions L1 and L3.

Then, the image data is read (S300). That is, the first and third layer image data portions L1 and L3 (or relevant part(s) of same) stored in the first memory 30 among the layer image data portions read by the display controller 14 in relation to the n-th frame image illustrated in FIG. 6 and the (n+1)-th frame image illustrated in FIG. 7 include one or more designated unit elements that require change. For example, in the case of the image data output to the display panel among the first layer image data L1, when the n-th frame image illustrated in FIG. 6 is changed to the (n+1)-th frame image illustrated in FIG. 7, via the first DMA port DMA1, the display controller 14 will read data associated with only the two (2) unit elements UEs requiring change, and therefore being designated.

Further, in the case of the image data output to the display panel among the second layer image data L2, when the n-th frame image illustrated in FIG. 6 is changed to the (n+1)-th frame image illustrated in FIG. 7, via the second DMA port DMA2, the display controller 14 will read only data associated with the three (3) unit elements UEs requiring change.

In contrast, in the case of the image data output to the display panel among the third layer image data L3, when the n-th frame image illustrated in FIG. 6 is changed to the (n+1)-th frame image illustrated in FIG. 7, the display controller 14 need not perform any read operation via the third DMA port DMA3.

Thereafter, in the case of the image data output to the display panel, which is generated by the change map controller 16 when the n-th frame image illustrated in FIG. 6 is changed to the (n+1)-th frame image of FIG. 7, positional information associated with certain designated unit elements requiring change may be provided to the interface 18, together with image data requiring change among the first, second and third layer image data portions L1 to L3.

Accordingly, the interface 18 generates partial image data with positional information 19 along with command(s) for updating same, and provide the partial image data 19 and command(s) to the DDI 20.

At this point in the method of FIG. 4, the frame buffer is updated (S400).

That is, referring to FIG. 3, the frame buffer updater 22 may update only the partial data 19 from among the image data stored in the frame buffer 24. Since positional information associated with the partial data is also provided, the task of updating the partial data is easily performed.

When the image data stored in the frame buffer 24 is updated and thereafter, when the image is displayed on the display panel by using the same, the (n+1)-th frame image F(n+1) may be displayed on the display panel.

As described above in relation to the semiconductor device 1, when some portion of the image being displayed on the display panel changes to a material degree, only such image as satisfies predetermined condition(s) among the totality of image data (e.g., layer image data portions L1 to Ln) must be read. Accordingly, the power consumption requirements associated with the read operation may be reduced. Further, drive power required for the DDI 20 may be reduced.

Figure 9:
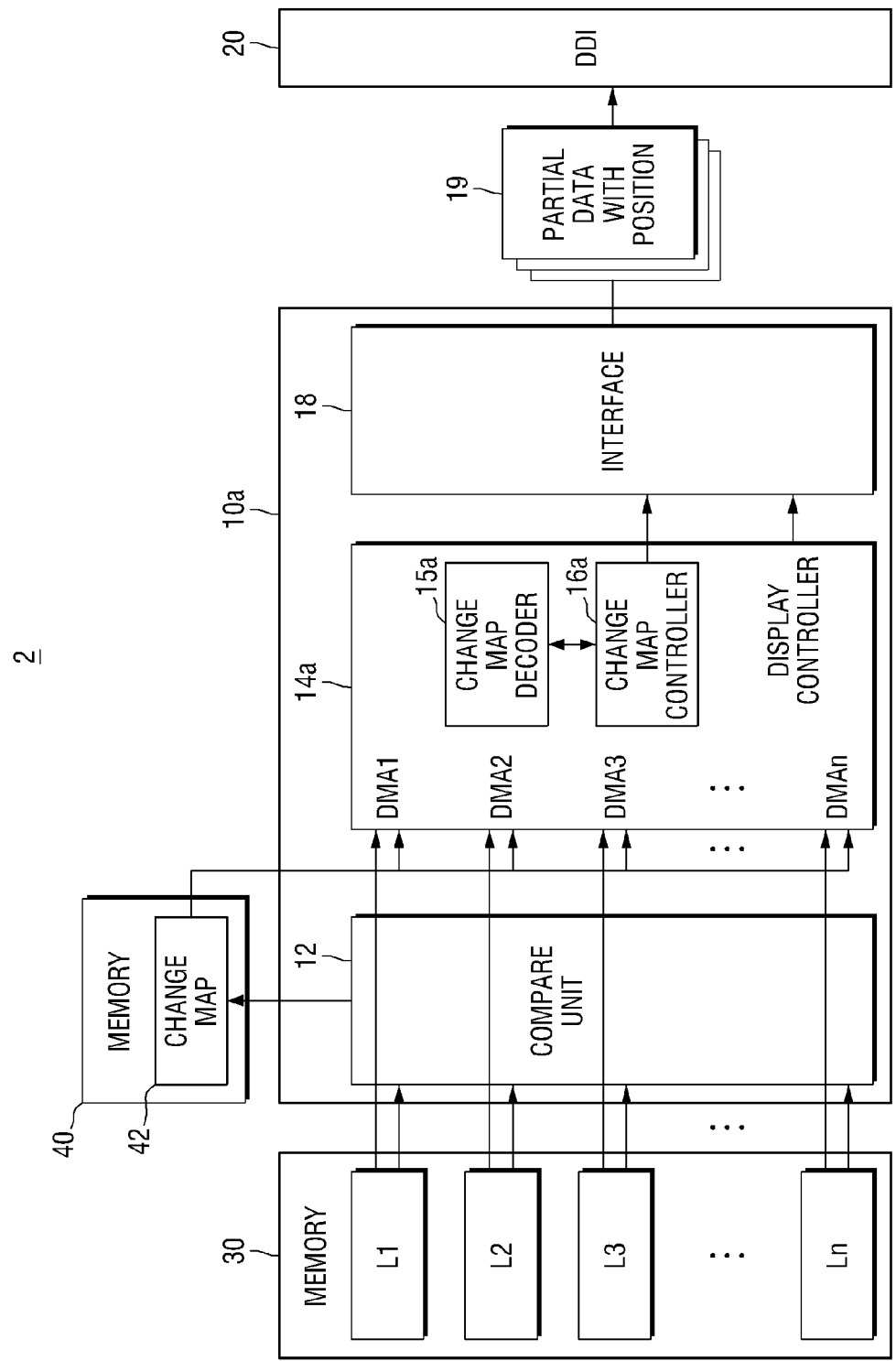
FIG. 9 is a block diagram of a semiconductor device according to another embodiment of the inventive concept.

FIG. 9 is a block diagram of a semiconductor device 2 according to another embodiment of the inventive concept. Hereinafter, only material difference(s) between the embodiments of FIGS. 1 and 9 will be described.

Referring to FIG. 9, a display controller 14a provided by AP 10a of the semiconductor device 2 may include a smaller number of DMA ports DMA1 to DMAn, as compared with the display controller 14 of FIG. 1.

Here, the display controller 14 of FIG. 1 includes a separate DMA port (e.g., DMA(n+1) for receiving the change map 42. However, this DMA port may be omitted in other embodiments of the inventive concept. When 'n' layer image data portions L1 to Ln are stored in the first memory 30, the display controller 14a need include only 'n' direct memory access (DMA) ports DMA1 to DMAn. In other words, the number of the DMA ports DMA1 to DMAn of the display controller 14a may be same as the number of the layer image data portions L1 to Ln stored in the first memory 30.

In the semiconductor device 2, the display controller 14a may read (e.g.,) a packet header type change map 42 via the plurality of respective DMA ports DMA1 to DMAn and provide the read change map 42 to a change map decoder 15a and a change map controller 16a.

In addition, the display controller 14a may read some data that satisfies the aforementioned predetermined condition among the plurality of layer image data L1 to Ln based on outputs of the change map decoder 15a and the change map controller 16a.

For example, the first DMA port DMA1 may be used to read information on the first layer image data L1 in the change map 42 and read some data that satisfies the aforementioned predetermined condition among the first layer image data L1.

The second DMA port DMA2 may be used to read information on the second layer image data L2 in the change map 42 and read some data that satisfies the aforementioned predetermined condition among the second layer image data L2.

The third DMA port DMA3 may be used to read information on the third layer image data L3 in the change map 42 and read some data that satisfies the aforementioned predetermined condition among the third layer image data L3.

The n-th DMA port DMAn may be used to read information on the n-th layer image data Ln in the change map 42 and read some data that satisfies the aforementioned predetermined condition among the n-th layer image data Ln.

Figure 10:
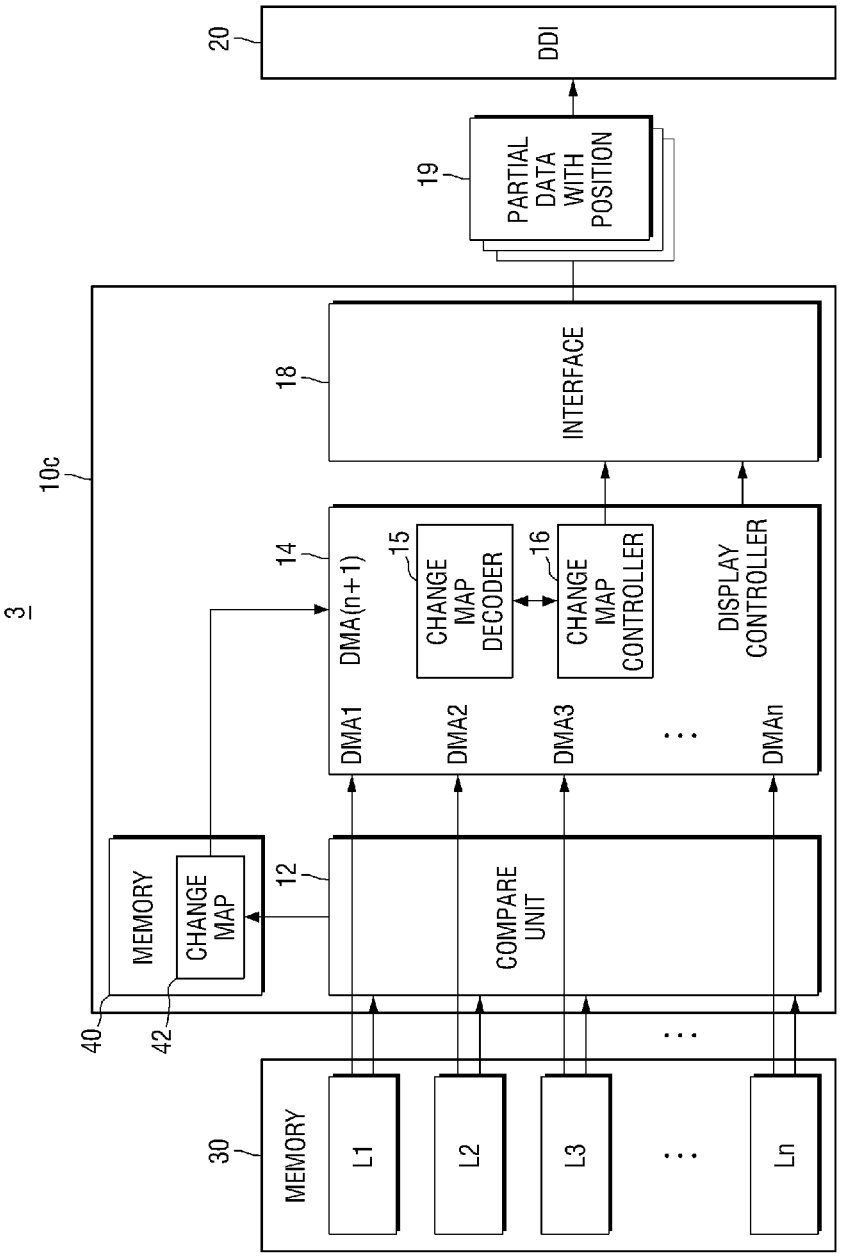
FIG. 10 is a block diagram of a semiconductor device according to yet another embodiment of the inventive concept.

FIG. 10 is a block diagram of a semiconductor device 3 according to yet another embodiment of the inventive concept. Here again, only material difference(s) between the embodiments of FIGS. 1, 9 and 10 will be described.

Referring to FIG. 10, an AP 10c of the semiconductor device 3 according to the embodiment of the inventive concept may include the second memory 40 storing the change map. In other words, in the semiconductor device 3 according to the embodiment, the second memory 40 configured to store the change map 42 may be disposed in the AP 10c.

In some embodiments of the inventive concept, the second memory 40 may be implemented by, for example, the SRAM, and the like, but the inventive concept is not limited thereto.

Figure 11:
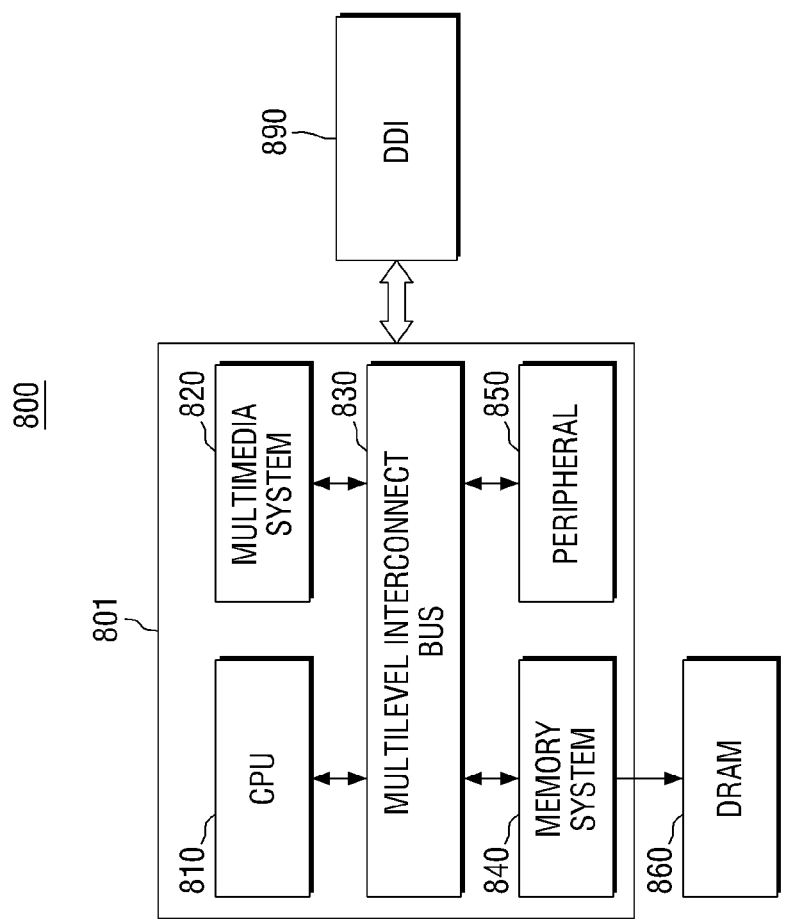
FIG. 11 is a block diagram of an SoC that may incorporate a semiconductor device according to an embodiment of the inventive concept.

FIG. 11 is a block diagram of a System-on-Chip (SoC) that may incorporate a semiconductor device according to an embodiment of the inventive concept.

Referring to FIG. 11, a SoC system 800 comprises an application processor 801, a DRAM 860, and a DDI 890.

The application processor 801 may include a central processing unit 810, a multimedia system 820, a bus 830, a memory system 840, and a peripheral circuit 850.

The central processing unit 810 may perform a calculation required for driving the SoC system 800. In some embodiments of the inventive concept, the central processing unit 810 may be configured under a multi-core environment including a plurality of cores.

The multimedia system 820 may be used to perform various multimedia functions in the SoC system 800. The multimedia system 820 may include a 3D engine module, a video codec, a display system, a camera system, a post-processor, and the like.

In some embodiments of the inventive concept, the multimedia system 820 may include the display controllers 14 and 14a of the semiconductor devices 1 to 3 according to the embodiments of the inventive concept.

The bus 830 may be used when the central processing unit 810, the multimedia system 820, the memory system 840, and the peripheral circuit 850 perform data communication with each other. In some embodiments of the inventive concept, the bus 830 may have a multi-layer structure. In detail, an example of the bus 830 may include a multi-layer advanced high performance bus (AHB) or a multi-layer advanced extensible interface (AXI), but the inventive concept is not limited thereto.

The memory system 840 may provide an environment required for the application processor 801 to be connected to the external memory (for example, the DRAM 860) and operate at a high speed. In some embodiments of the inventive concept, the memory system 840 may include a separate controller (for example, a DRAM controller) for controlling the external memory (for example, the DRAM 860).

The peripheral circuit 850 may provide an environment required for the SoC system 800 to smoothly access an external device (for example, a main board). As a result, the peripheral circuit 850 may include various interfaces so that the external device connected to the SoC system 800 is compatible.

The DRAM 860 may serve as an operating memory required for the application processor 801 to operate. In some embodiments of the inventive concept, the DRAM 860 may be disposed outside the application processor 801 as illustrated in FIG. 11. In detail, the DRAM 860 may be packaged with the application processor 801 in a package on package (PoP) form.

In some embodiments of the inventive concept, the DRAM 860 may store the first to n-th layer image data L1 to Ln of the semiconductor devices 1 to 3 according to the embodiments of the inventive concept.

Figure 12:
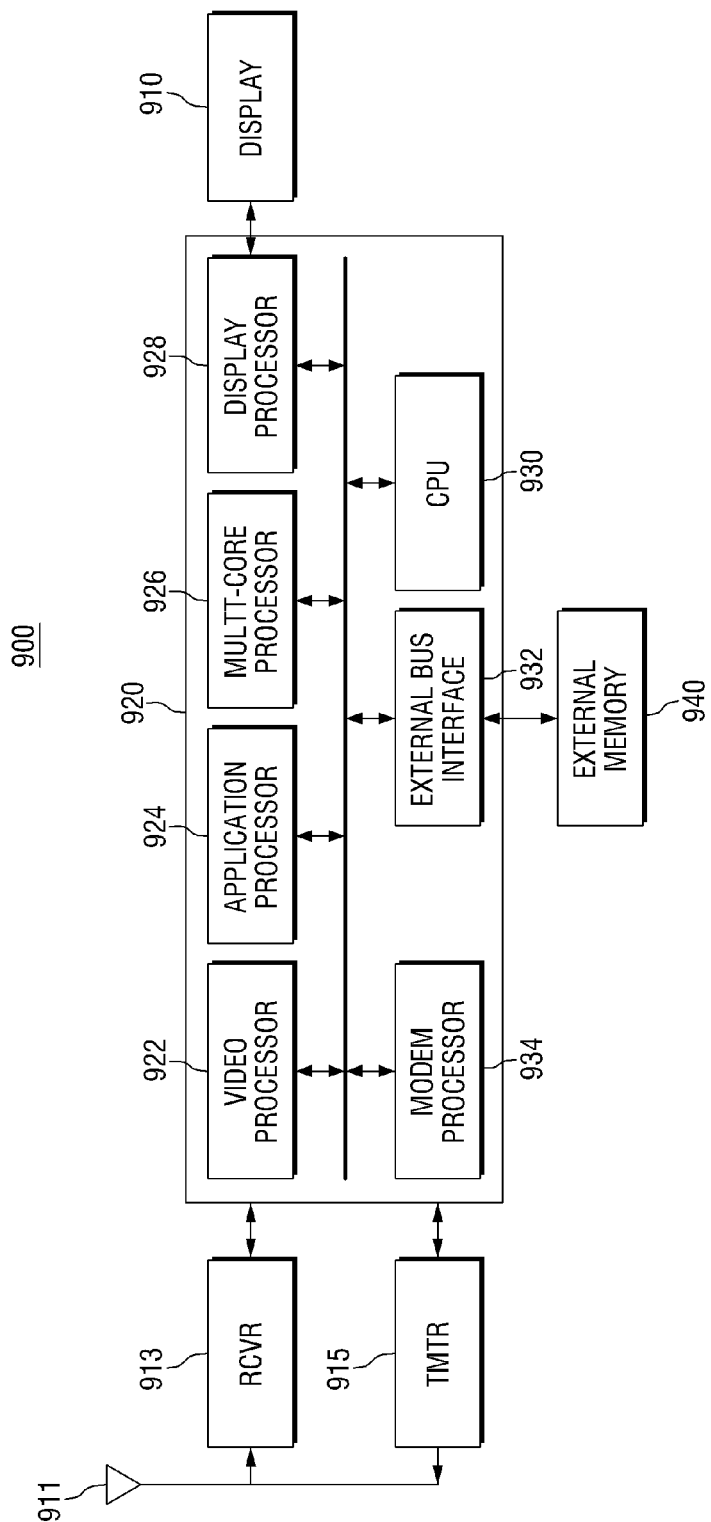
FIG. 12 is a block diagram illustrating a wireless communication device that may incorporate a semiconductor device according to an embodiment of the inventive concept.

FIG. 12 is a block diagram illustrating a wireless communication device that may incorporate a semiconductor device according to an embodiment of the inventive concept.

Referring to FIG. 12 the device 900 may be a cellular phone, a smart phone terminal, a handset, a personal portable assistant (PDA), a laptop computer, a video game unit, or other devices. The device 900 may adopt code division multiple access (CDMA), time division multiple access (TDMA) such as a global system for mobile communication GSM, or other wireless communication standards.

The device 900 may provide bidirectional communication through a reception path and a transmission path. Signal transmitted by one or more base stations on the reception path may be received by an antenna 911 and provided to a receiver (RCVR) 913. The receiver 913 may condition and digitalize the received signal and provide samples to a digital section 920 for additional processing. On the transmission path, a transmitter (TMTR) 915 may receive data transmitted from the digital section 920 and process and condition the data, and generate a modulated signal and the modulated signal may be transmitted to one or more base stations through the antenna 911.

The digital section 920 may be implemented by one or more digital signal processor DSPs, a micro-processor, a reduced instruction set computer (RISC), and the like. Further, the digital section 920 may be manufactured on one or more application specific integrated circuit (ASIC) or other type integrated circuit (IC).

The digital section 920 may include various processing and interface units including, for example, a modem processor 934, a video processor 922, an application processor 924, a display processor 928, a multicore processor 926, a central processing unit 930, and an external bus interface 932.

The modem processor 934, the video processor 922, the application processor 924, the display processor 928, the multicore processor 926, the central processing unit 930, and the external bus interface 93 may be connected to each other through a bus as illustrated in FIG. 12.

The video processor 922 may perform processing of graphic applications. In general the video processor 922 may include any number of processing units or modules for any set of graphic operations.

A specific part of the video processor 922 may be implemented by firmware and/or software. For example, a control unit may be implemented by firmware and/or software modules (for example, procedures, functions, and the like) that perform the aforementioned functions. Firmware and/or software codes may be stored in a memory and may be executed by a processor (for example, the multi-core processor 926). The memory may be implemented inside the processor or outside the processor.

The video processor 922 may implement a software interface such as open graphic library (OpenGL), Dirrect3D, or the like.

The central processing unit 930 may perform a series of graphic processing operations together with the video processor 922.

In some embodiments of the inventive concept, in the change map 42 of the semiconductor devices 1 to 3 according to the embodiments of the inventive concept, at least one of the video processor 922 and the central processing unit 930 may be generated.

The multi-core processor 926 includes at least two cores to allocate workloads to two cores depending on a workload to be processed by the multi-core processor 926 to simultaneously process the corresponding workloads.

The display processor 928 may perform various processing regarding an image output to the display 910.

At least one of the application processor 924 and the display processor 928 may adopt the configurations of the semiconductor devices 1 to 3 according to the embodiments of the inventive concept described above.

The modem processor 934 may perform various processing associated with communication in the digital section 920.

The external bus interface 932 may be connected to an external memory 940.

Figure 13:
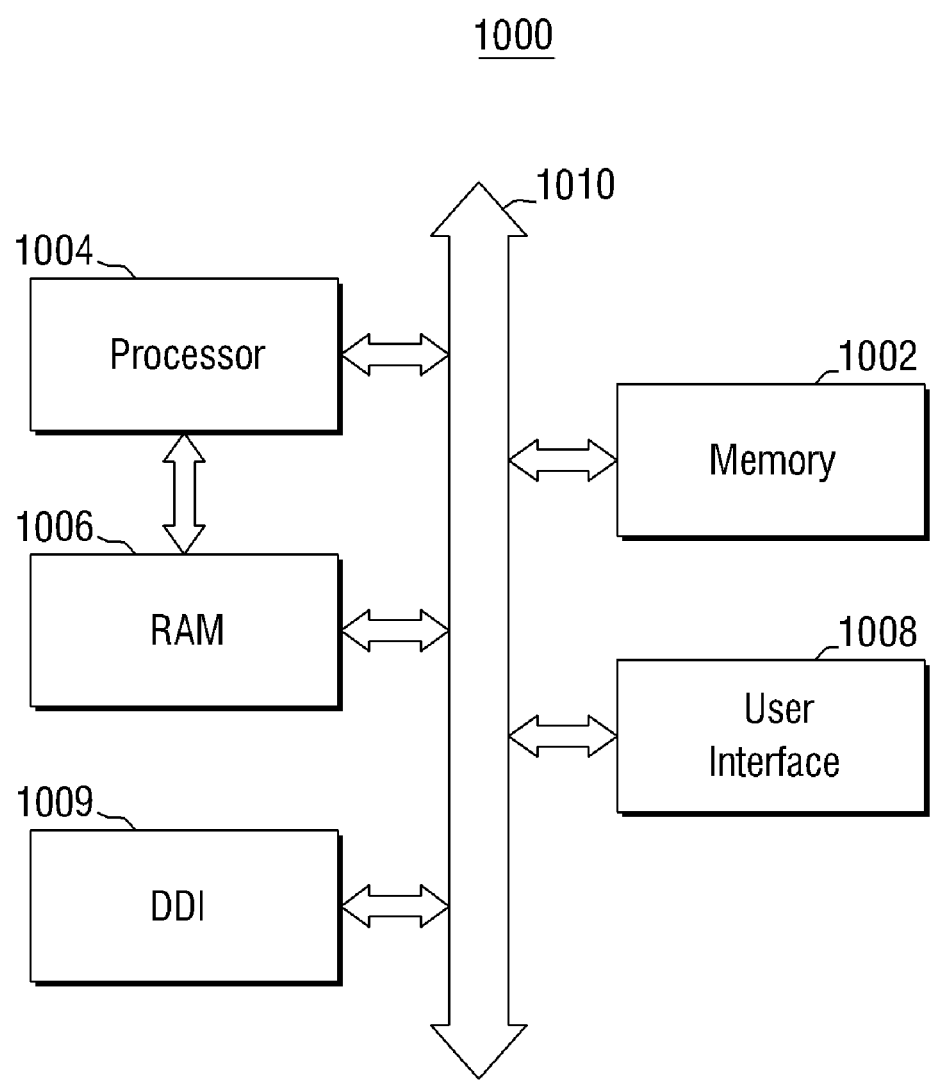
FIG. 13 is a block diagram illustrating an electronic system that may incorporate a semiconductor device according to an embodiment of the inventive concept.

FIG. 13 is a block diagram illustrating an electronic system that may incorporate a semiconductor device according to an embodiment of the inventive concept.

Referring to FIG. 13, the electronic system 1000 may include a memory system 1002, a processor 1004, a RAM 1006, a user interface 1008, and a DDI 1009.

The memory system 1002, the processor 1004, the RAM 1006, the user interface 1008, and the DDI 1009 may perform data communication with each other by using a bus 1010.

The processor 1004 may serve to execute a program and control the electronic system 1000 and may include at least one micro-processor, digital signal processor, a micro-controller, and at least one of logic elements that may perform similar functions.

The RAM 1006 may be used as an operating memory of the processor 1004. The RAM 1006 may be configured by, for example, the volatile memory such as the DRAM. Meanwhile, the processor 1004 and the RAM 1006 may be implemented by one semiconductor element or packaging to a semiconductor package.

The user interface 1008 may be used to input or output data in or from the electronic system 1000. An example of the user interface 1008 may include a keypad, a keyboard, an image sensor, and a display device.

The memory system 1002 may store a code for operating the processor 1004 and data processed by the processor 1004 or data input from the outside. The memory system 1002 may include a separate controller for driving and may be configured to additionally include an error correction block. The error correction block may be configured to detect and correct an error of data stored in the memory system 1002 by using an error correction code ECC.

Meanwhile in an information processing system such as a mobile apparatus or a desktop computer, a flash memory may be mounted on the memory system 1002. The flash memory may be configured by a semiconductor disk device (solid state drive (SSD)). In this case, the electronic system 1000 may stably store large-capacity data in the flash memory.

The memory system 1002 may be integrated on one semiconductor device. For example, the memory system 1002 is integrated on one semiconductor device to configure a memory card. For example, the memory system 1002 is integrated on one semiconductor device to configure memory cards such as a PC card (personal computer memory card international association (PCMCIA) card, a compact flash card (CF), a smart media card (SM and SMC), a memory stick, a multimedia card (MMC, RS-MMC, and MMCmicro), an SD card (SD, miniSD, microSD, and SDHC), a universal flash memory device (UFS), and the like.

In some embodiments of the inventive concept, the DDI 1009 may adopt the DDI 20 of the semiconductor devices 1 to 3 according to the embodiments of the inventive concept described above.

Figure 14:
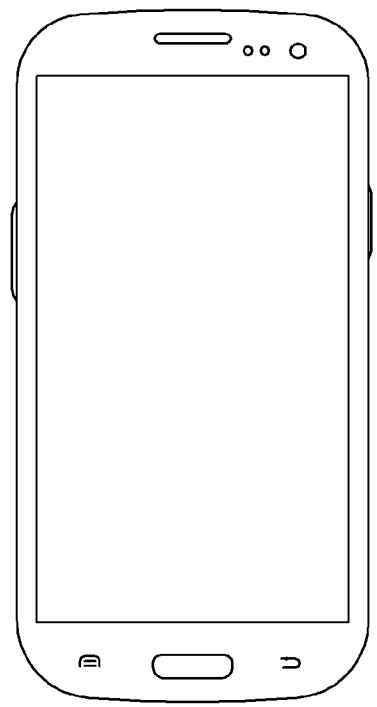
FIG. 14 is a diagram illustrating an example in which the electronic system of FIG. 1 is applied to a smart phone.

The electronic system 1000 illustrated in FIG. 13 may be applied to electronic control devices of various electronic apparatuses. FIG. 14 is a diagram illustrating the electronic system of FIG. 13 as applied to a smart phone.

When the electronic system 1000 of FIG. 13 is applied to the smart phone 1001 as described above, some components of the electronic system 1000 of FIG. 13 may be implemented as the application processor.

Figure 15:
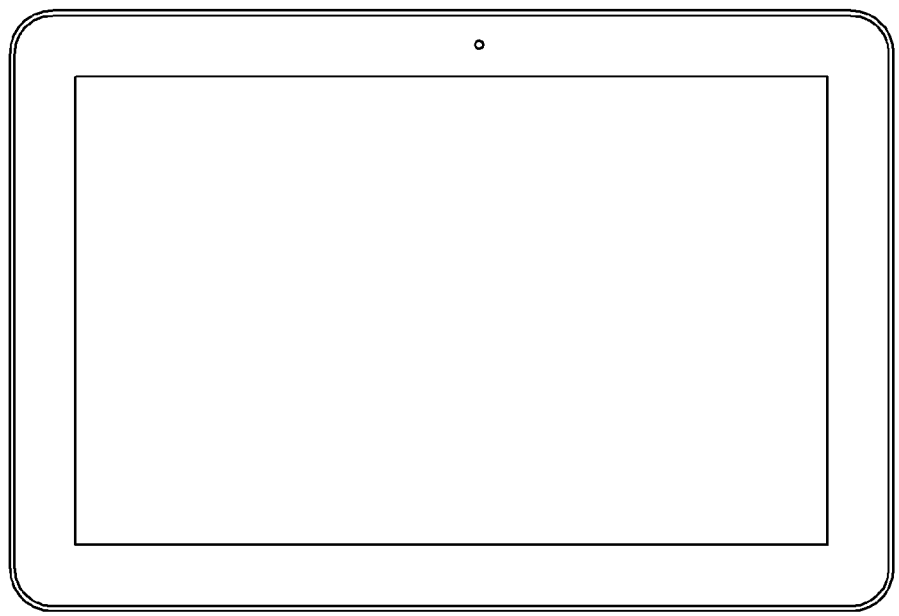
FIG. 15 is a diagram illustrating the electronic system of FIG. 13 as applied to a tablet PC.
Figure 16:
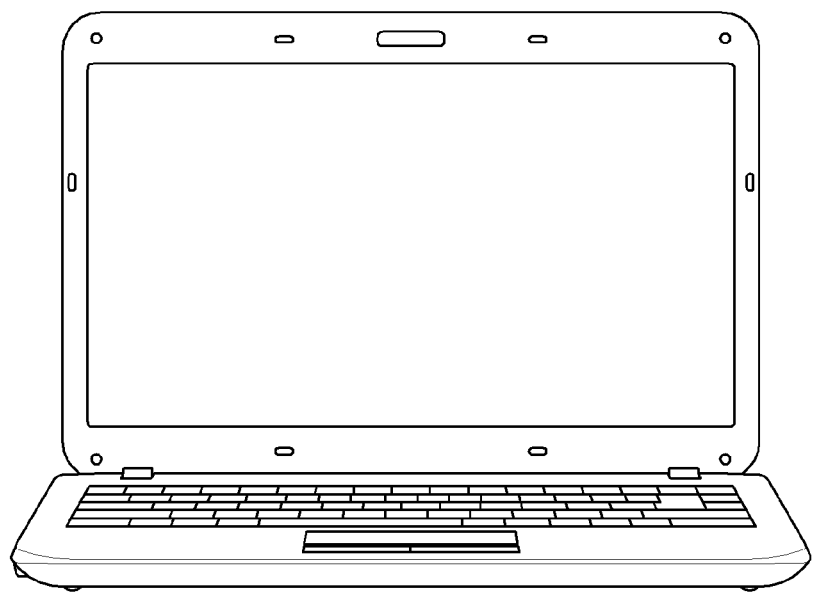
FIG. 16 is a diagram illustrating the electronic system of FIG. 13 as applied to a notebook computer.

Meanwhile, the electronic system 1000 of FIG. 13 may be adopted even in various other electronic apparatuses. FIG. 15 is a diagram illustrating the electronic system of FIG. 13 as applied to a tablet PC 1100. FIG. 16 is a diagram illustrating the electronic system 1000 of FIG. 13 as applied to a notebook computer 1200.

Besides, the electronic system 1000 of FIG. 13 may be provided as one of various components of the electronic apparatus such as a personal computer, an ultra mobile PC (UMPC), a workstation, a net-book, a personal digital assistant (PDA), a portable computer, a web tablet PC, a wireless phone, a mobile phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, a device capable of transmitting and receiving information under a wireless environment, one of various electronic apparatuses constituting a home network, one of various electronic apparatuses constituting a computer network, one of various electronic apparatuses constituting a telematics network, an RFID device, or one of various components constituting a computing system, and the like.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A semiconductor device comprising:
    a first memory that stores a first layer image data portion and a second layer image data portion among a plurality of layer image data portions used to generate a first frame image and a second frame image on a display device, wherein the first layer image data portion includes a first plurality of unit elements and the second layer image data portion includes a second plurality of unit elements;
    a second memory that stores a change map wherein the change map identifies one or more designated unit elements which are required to be changed between the first frame image and the second frame image among the first plurality of unit elements;
    a display controller that generates positional information associated with the first layer image data portion in response to the change map as the first frame image changes to the second frame image on the display device, wherein the positional information is associated with the one or more designated unit elements which are required to be changed between the first frame image and the second frame image, and reads only at least some part of the first layer image data portion, wherein the positional information and the at least some part of the first layer image data portion are provided as partial image data;
    an interface that receives the partial image data and generates a command for updating the one or more designated unit elements among the first plurality of unit elements of the first layer image data portion during generation of the second frame image.

2. The semiconductor device of claim 1, wherein the first layer image data portion is data used to display a first region of the first frame image on one or more upper columns of the display device,
    the second layer image data portion is data used to display a second region of the first frame image on columns of the display device which are located below the one or more upper columns of the display device, and
    the second layer image portion does not change from the first frame image to the second frame image.

3. The semiconductor device of claim 1, wherein the display controller and interface are disposed in an application processor, and the first memory is disposed external to the application processor.

4. The semiconductor device of claim 1, wherein the layer image data portion including the changing at least one unit element is designated by the display controller.

5. The semiconductor device of claim 1, wherein each one of the first plurality of unit elements and second plurality of unit elements is a tile.

6. The semiconductor device of claim 1, wherein the second frame image is output to the display device after the first frame image.

7. The semiconductor device of claim 1, wherein the display controller generates the change map by comparing each one of the plurality of layer image data portions respectively associated the first frame image and second frame image using a cyclic redundancy check operation.

8. The semiconductor device of claim 1, wherein the second memory, the display controller, and the interface are disposed in an application processor AP.

9. The semiconductor device of claim 1, wherein the display controller comprises:
a change map decoder that decodes the change map to generate a decoding result; and
a change map controller that decodes the positional information based on a decoding result to provide the positional information to the interface.

10. The semiconductor device of claim 9, wherein the display controller comprises a number of direct memory access (DMA) ports equal to a number of the plurality of layer image data portions that respectively provide the plurality of layer image data portions from the first memory to the display controller.

11. The semiconductor device of claim 10, wherein the display controller additionally comprises; a DMA port that provides the change map from the display controller to the second memory.

12. The semiconductor device of claim 1, wherein the plurality of layer image data portions includes at least:
the first layer image data portion corresponding to one or more upper region portions of the first and second frame images to be displayed in on one or more upper most columns of the display device,
the second layer image data portion corresponding to one or more central region portions of the first and second frame images, the central region portions to be displayed below in one more next upper most columns of the display device which are disposed below the upper most portions of the display device, and
a third layer image data portion corresponding to one or more lower region portions of the first and second frame images, the lower region portions to be displayed on one or more last columns of the display device which are disposed below the one or more next upper most columns of the display device.

13. A semiconductor device, comprising:
a first memory that stores a plurality of layer image data portions respectively corresponding to regions of first and second frame images, wherein the layer image data portions comprise a plurality of unit elements;
a comparison unit that compares layer image data portions for the first and second frame images and generates a change map to be stored in a second memory, wherein the change map identifies one or more designated unit elements which are required to be changed between the first frame image and the second frame image among the plurality of unit elements; and
a display controller that decodes the change map to designate at least one of the layer image data portions in view of a predetermined condition, and generates positional information associated with one or more of the designated unit elements in the at least one designated layer image data portion which are required to be changed between the first frame image and the second frame image.

14. The semiconductor device of claim 13, wherein the display controller comprises:
a number of direct memory access (DMA) ports equal to a number of the plurality of layer image data portions that respectively provide the plurality of layer image data portions from the first memory to the display controller.

15. The semiconductor device of claim 14, wherein the display controller additionally comprises a DMA port that provides the change map from the display controller to the second memory.

16. A semiconductor device, comprising:
a frame buffer that buffers image data to be provided to a display panel;
a frame buffer updater that, when an image output to be provided to the display panel is changed from a first frame image to a second frame image, receives image data associated with one or more designated unit elements requiring change among a plurality of unit elements of the second frame image, and further receives positional information associated with the one or more designated unit elements, and in response thereto updates the image data stored in the frame buffer in accordance with the received image data associated with the one or more designated unit elements and the positional information associated with the one or more designated unit elements; and
a driver configured to output an image signal based on the updated image data stored in the frame buffer to the display panel.

17. The semiconductor device of claim 16, wherein the image data includes first layer image data used to generate some portion of the second frame image and second layer image data used to generate some other portion of the first frame image.

18. The semiconductor device of claim 16, further comprising:
a timing controller that controls the output of the image signal by the driver to the display panel.

19. The semiconductor device of claim 18, wherein the image signal comprises at least one of a gate control signal and a source control signal.

20. The semiconductor device of claim 16, wherein the unit element is a tile.

* * * * *